United States Patent [19]

Berner

[11] Patent Number: 4,822,200
[45] Date of Patent: Apr. 18, 1989

[54] OVERLOAD PROTECTOR FOR A ROBOT

[75] Inventor: Klaus Berner, Reilingen, Fed. Rep. of Germany

[73] Assignee: Siemens Aktiengesellschaft, Berlin and Munich, Fed. Rep. of Germany

[21] Appl. No.: 127,853

[22] Filed: Dec. 2, 1987

[30] Foreign Application Priority Data

Dec. 9, 1986 [DE] Fed. Rep. of Germany ....... 3641919

[51] Int. Cl.⁴ ................................................. F16D 1/00
[52] U.S. Cl. .................................... 403/229; 248/580; 267/155; 403/220
[58] Field of Search ................ 403/229, 220; 248/580, 248/581, 608, 611, 613; 297/333, 307; 267/137, 155, 154, 157

[56] References Cited

U.S. PATENT DOCUMENTS

| | | | |
|---|---|---|---|
| 1,019,397 | 3/1912 | Winins | 297/333 |
| 2,138,517 | 11/1938 | Sievenking | 267/155 |
| 3,212,745 | 10/1965 | Lode | 248/580 |
| 4,741,642 | 5/1988 | Carlton | 403/229 |

FOREIGN PATENT DOCUMENTS 3241132  5/1984  Fed. Rep. of Germany .

*Primary Examiner*—James T. McCall
*Attorney, Agent, or Firm*—Mark H. Jay

[57] ABSTRACT

At least one torsion spring is traversely mounted between first and second elements of an overload protector. One end of the spring is elongated to form a pressure arm which bears against the second element.

6 Claims, 1 Drawing Sheet

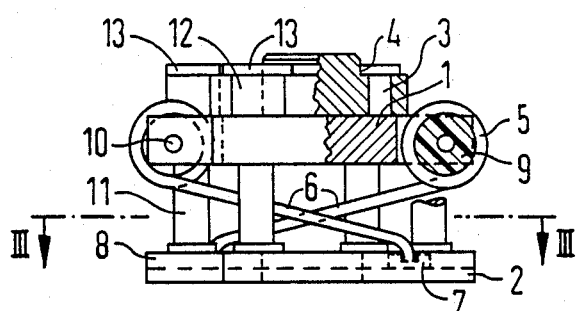
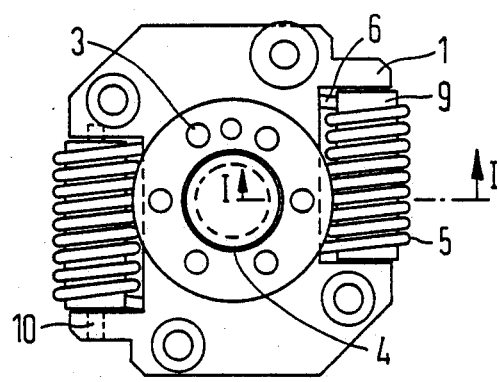
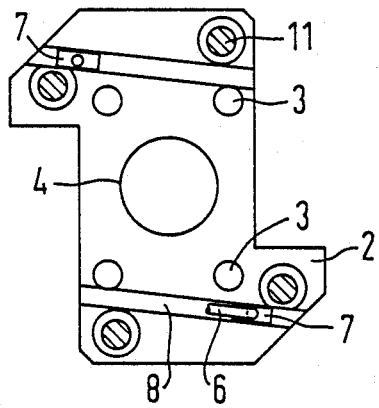

OVERLOAD PROTECTOR FOR A ROBOT

BACKGROUND OF THE INVENTION

The invention relates to robotics, and more particularly relates to overload protectors for robot arms.

A device of this type is shown in German Offenlegungsschrift 32 1 132. In this known device, there are two elements, one being secured to the robot arm and the other being secured to the tool or tool holder. These elements are held together by holding bolts, and an axial compression spring holds the elements apart. When sufficient force is exerted on the tool or tool holder, as in the case of an overload, the spring is compressed and the tool axis buckles with respect to the axis of the robot arm. This triggers an internal sensor which halts further operation and thereby protects the robot arm from damage.

SUMMARY OF THE INVENTION

One object of the invention is to provide a robot arm overload protector which is short and which permits a relatively large excursion between the tool/tool holder and the robot arm itself.

Another object is to provide a protector of this type in which the preloading between the elements does not change greatly at different excursions.

A further object is, in general, to improve on known devices of this type.

In accordance with the invention, an overload protector has two elements which are movable axially towards and away from each other. At least one torsion spring presses the two elements apart. The torsion spring is transverse to the axis of the overload protector and is attached to one of the coupling elements. Each of the springs urges a pressure arm to bear against the other element.

Because the springs are torsion springs and are transverse to the axis of the overload protector, they take up little axial height. By manufacturing the torsion springs with a large number of turns, the force exerted by the pressure arm changes only slightly even during large motions of the two elements with respect to each other. One advantageous consequence of this is that it is possible to manufacture an overload protector with a low preloading even for large excursions.

Advantageously, the torsion spring is of coiled wire and the pressure arm is a linear extension of the wire. This is simple to manufacture. Further advantageously, the two elements are kept in alignment by mating guide bushings and guide pins. This prevents the two elements from becoming disaligned.

In the preferred embodiment, there are a plurality of torsion springs which are arranged symmetrically about the axis. This reduces the transverse forces between the two elements and makes the response of the protector less dependant upon the direction from which the overload occurs.

Advantageously, the free end of each torsion spring is supported on a slider which slides along a track in the second element. This linearizes the relationship between the load on the overload protector and the motion of the two elements with respect to each other at the very beginning of motion. In the preferred embodiment, this is further accomplished by mounting the springs on rotatable rollers.

BRIEF DESCRIPTION OF THE DRAWINGS

Exemplary and non-limiting preferred embodiments of the invention are shown in the drawings, in which:

FIG. 1 is a side and partially cross sectional view of a preferred embodiment of the invention;

FIG. 2 is a top view of the preferred embodiment; and

FIG. 3 is a section through the preferred embodiment along the Plane III—III in FIG. 1.

DETAILED DESCRIPTION OF PREFERRED EMBODIMENTS

In the Preferred embodiment, there are two elements, element 1 and element 2. Element 1 is adapted for attachment to a tool or tool holder (not shown) using attachment holes 3, and element 2 is adapted for attachment to a robot arm (not shown) via attachment holes 3. Each of the elements 1 and 2 has an annular centering projection 4 which permits the device to be accurately secured to the robot arm and tool/tool holder.

In this example, two symmetrical torson springs 5 made for example of wire are mounted to the element 1. Each spring 5 is mounted on a cylindrical roller 9 which is made for example of plastic, and each roller 9 is secured to the element 1 by a shaft 10, on which the roller 9 rotates freely.

One end of each of the torsion springs 5 bears against the underside of the element 1. The other end of each of the torsion springs 5 is elongated in a straight line to form a pressure arm 6. The distal end of each of the pressure arms 6 is inserted into a slide element 7 which is entrained within a corresponding groove 8 in the element 2.

When the elements 1 and 2 are urged toward each other, the torsion springs are wound up as the slider elements 7 slide radially outwardly in their grooves 8. To keep the elements 1 and 2 in proper alignment, the element 2 supports guide pins 11 which enter into mating guide bushings 12 that are secured to the element 1. The guide pins 11 and mating bushings 12 are parallel to the axis. Reference numeral 13 indicates a plate which is secured to the end of each guide pin 11.

When the elements 1 and 2 are moved towards each other, the springs 5 are torsioned to a comparatively small extent because they have comparatively long pressure arms 6. Additionally, the arms 6 move comparatively freely because of the slider elements 7 and mating grooves 8. As a result, the force exerted by the torsion springs 5 remains relatively low regardless of the excursion of the elements 1 and 2, so that the preferred embodiment is suitable for use in low-force applications such as assembly operations.

Those skilled in the art will understand that changes can be made in the preferred embodiments here described, and that these embodiments can be used for other purposes. Such changes and uses are within the scope of the invention, which is limited only by the claims which follow.

What is claimed is:

1. An overload protector for connection between a robot arm and a tool holder, comprising:
    first and second elements, of which a one is securable to a robot arm and of which another one is securable to a tool holder;
    means for securing the first and second elements together in such a manner that the first element is restricted to axially directed movement towards and away from the second element; and at least one transversely extending torsion spring attached to one of said elements and having
- a first free end which is also attached to said one of said elements and
- a second free end which is formed as an elongated pressure arm and which bears resiliently against another one of said elements.

2. The overload protector of claim 1, further comprising axially elongated guide bushings and mating guide pins which are secured between the elements in a manner that the elements are maintained in axial alignment with each other during back and forth motion of the first element.

3. The protector of claim 1, wherein there are at least two torsion springs and said springs are arranged symmetrically about said axis.

4. The protection of claim 1, wherein each pressure arm has a distal end which is connected to a sliding element which slides with respect to said another one of said elements.

5. The protector of claim 4, wherein each sliding element is entrained within a corresponding groove in said another one of said elements.

6. The protector of claim 1, wherein each of said torsion springs is mounted upon a corresponding roller which is rotatably secured to said one of said elements.

* * * * *